United States Patent [19]

Bare, IV

[11] Patent Number: 5,523,925

[45] Date of Patent: Jun. 4, 1996

[54] LIGHT EMITTING DEVICE FOR BICYCLE

[76] Inventor: James G. Bare, IV, 16210 Inheritance Dr., Brandywine, Md. 20613

[21] Appl. No.: 387,091

[22] Filed: Feb. 13, 1995

[51] Int. Cl.⁶ ........................................... B62J 6/00
[52] U.S. Cl. .................. 362/72; 280/828; 362/806; 362/193; 446/23
[58] Field of Search .............. 446/22, 23; 362/192, 362/191, 193, 72, 159, 396, 806, 811, 78; 280/828

[56] References Cited

U.S. PATENT DOCUMENTS

| | | | |
|---|---|---|---|
| 585,529 | 6/1897 | Madden | 446/23 X |
| 1,073,747 | 9/1913 | Eichert | 312/193 X |
| 1,224,843 | 5/1917 | Bradley | 446/23 X |
| 1,244,262 | 10/1917 | DcUcnter | 362/193 |
| 1,589,087 | 6/1926 | Aronson | 446/22 |
| 1,616,384 | 2/1927 | Mallard | 446/22 |
| 1,653,701 | 12/1927 | Guérard | 446/22 |
| 1,705,388 | 6/1932 | Arnold | 446/22 |
| 1,862,996 | 3/1932 | Arnold | 446/22 |
| 2,233,039 | 2/1941 | Vianzone | 362/193 |
| 3,488,021 | 11/1949 | May | 362/193 X |
| 4,019,171 | 4/1977 | Martelet | 362/72 |
| 4,466,630 | 8/1984 | Larkin | 446/23 |
| 4,556,396 | 12/1985 | Kennedy et al. | 446/23 |
| 5,165,776 | 11/1992 | Wu | 362/72 |

FOREIGN PATENT DOCUMENTS

| | | |
|---|---|---|
| 669845 | 12/1937 | Germany. |
| 366809 | 4/1931 | United Kingdom. |
| 484410 | 11/1936 | United Kingdom. |
| 666951 | 2/1952 | United Kingdom. |

*Primary Examiner*—Denise L. Gromada
*Assistant Examiner*—Thomas M. Serber
*Attorney, Agent, or Firm*—Richard C. Litman

[57] ABSTRACT

A light emitting device for bicycles has a dynamo-like pinion arrangement. A spinner rotates an abrasive material across a flint, emitting sparks which illuminate a transparent or translucent vessel of the device. The device is mounted to one rear wheel strut of a bicycle frame and includes a mechanism which urges the spinner against the rear tire. A lock mechanism provides a second unengaged position for the device. A flint holder provides both a guide bore for the flint, and applies pressure behind the flint, thereby urging the flint against the abrasive material. This provides a non-electrical light source for bicycles in which sparks of intensity proportionate to the speed of cycling are created.

14 Claims, 4 Drawing Sheets

LIGHT EMITTING DEVICE FOR BICYCLE

BACKGROUND OF THE INVENTION

1. Field of the Invention

The present invention relates to illumination devices for bicycles. More particularly, the present invention relates to a device mounted on the rear strut of a bicycle frame which translates mechanical energy from tire rotation to light for illumination.

2. Description of the Prior Art

Producing sparks through frictional contact is generally known. One type of device involves the relative rotation of a circular band of one material against tensioned contact of another material. For example, U.S. Pat. No. 1,589,087 to Aronson describes a reflecting sparkler having a circular band of abradant material mounted upon a reflective rotating disk, and pyrophoric material in contact with the abradant band which is mounted in spring loaded cylinders. The disk is rotated through a pull string racheting drive mechanism.

Similarly, U.S. Pat. No. 1,616,384 to Mallard describes a toy lighthouse which may include sparkling illumination, through the relative rotation of spring loaded "fingers" against a disk having a serrations in a circular band. Other devices of this type are described in U.S. Pat. Nos. 1,705,388 and 1,862,996 to Arnold, as well as British Patent GB 366,809, to Arnold.

Another type of sparking device utilizes a rotating drum or cylinder relative a stylus, or other contact means. For example, U.S. Pat. No. 1,653,701 to Guérard describes a device for producing luminous showers wherein a multiplicity of sticks or blades made of steel or like material are relatively rotated around a grinding wheel to create sparks. Other patents which describe sparking devices based on contact of a stationary stylus and a rotating drum include British Patent GB 484,410 to Arnold, British Patent GB 666,951 to Ernst, and German Patent DT 669,845 to Schneider.

Light generating devices for bicycles are known. Typically, these require the initial generation of electricity through transformation of mechanical energy. For example, U.S. Pat. No. 4,019,171 to Martelet describes a bicycle generator/electric light system which includes a tire engaging device which translates tire rotation into electrical energy. U.S. Pat. No. 5,165,776 to Long-Jen describes another such device which requires specially configured tires.

None of the above inventions and patents, taken either singly or in combination, is seen to describe the instant invention as claimed.

SUMMARY OF THE INVENTION

The present invention is an illumination device for bicycles. The device includes a spinner which rotates a cylinder with an abrasive surface across a pyrophoric material. Sparks are created which illuminate the device through a non-opaque section. The device is mounted to one rear wheel strut of a bicycle frame and includes a mechanism which urges the spinner against the rear tire. When the rear tire is rotated in locomotion, the spinner also rotates, creating sparks from the frictional contact of the cylinder and the pyrophoric material.

A lock mechanism provides a second unengaged position for the device. The lock mechanism may be released to engage the device, and is easily reset by pulling the device away from the tire. A holder may be provided which acts as both a guide bore for the pyrophoric material, as well as providing easy access to replace depleted supplies thereof. The holder further includes a mechanism for urging the pyrophoric material against the abrasive surface.

Accordingly, it is a principal object of the invention to provide a non-electrical light source for bicycles.

It is another object of the invention to provide a device for bicycles which provides pyrotechnic illumination in the form of sparks.

It is a further object of the invention to provide such a device which sparks with intensity proportionate to the speed of cycling.

Still another object of the invention is to provide a device which is easily engaged and disengaged, and whose consumable sparking materials are easily replaced.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following description and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
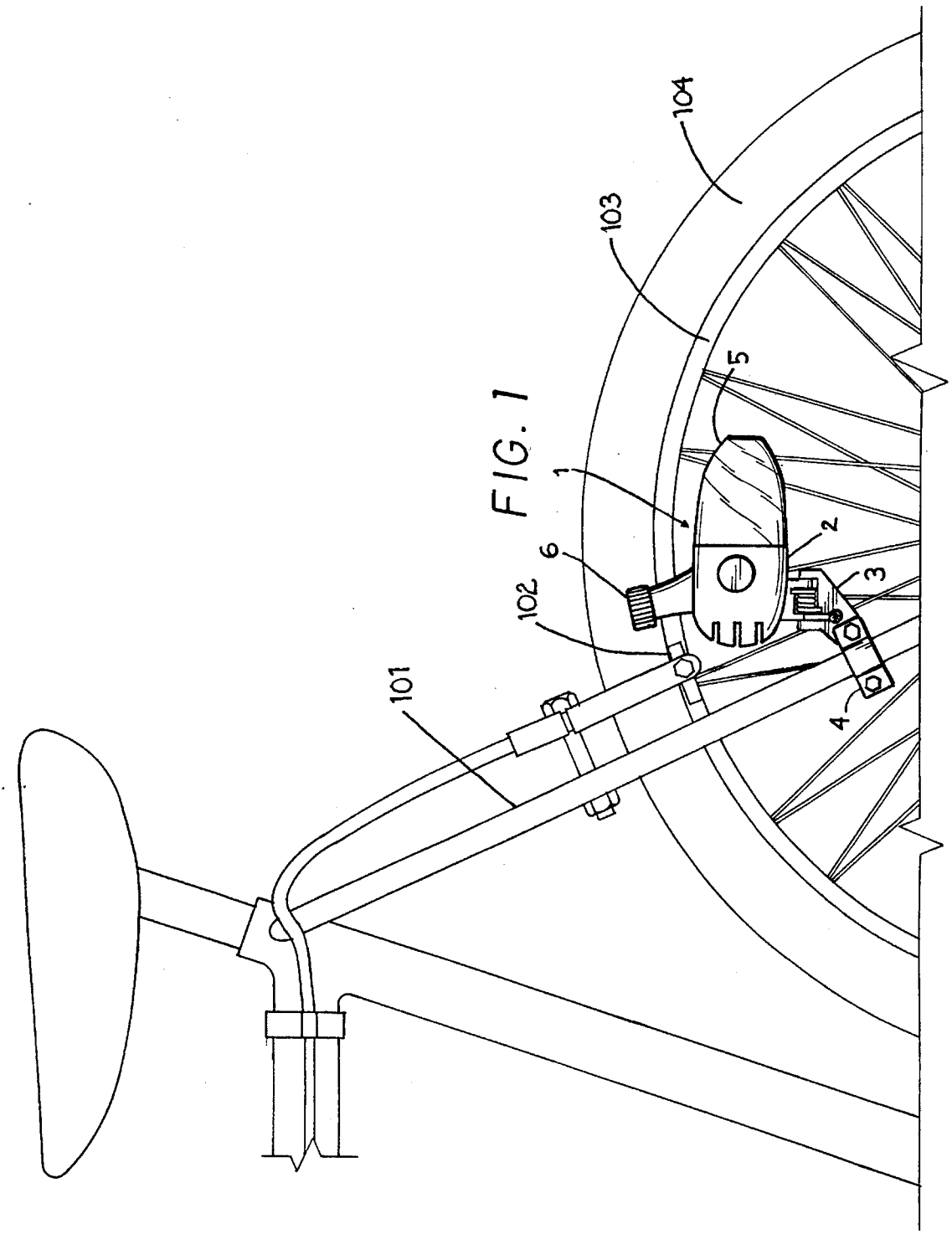
FIG. 1 is an environmental side view showing one embodiment of the present invention as mounted on a bicycle.

With particular reference to FIG. 1 of the drawings, the present invention is an illumination device 1 for bicycles. The device includes a hollow casing 2, which supports a spinner 6, a non-opaque, hollow display vessel 5, attached to the rear of casing 2, and a support for attaching the casing to a rear strut 101 of a bicycle. The device is positioned along strut 101 such that spinner 6 rests on a side of rear tire 104, just above rear wheel rim 103. The support is hingedly attached to casing 2, such that the casing is urged against rear tire 104.

Preferably, the device is positioned proximate a rear brake assembly 102, without hindering the deployment of the rear brakes. The support may include a pivot, to allow the casing of the device to be positioned parallel to the ground, regardless of the angle of rear strut 101. This pivot divides the support into a strut attachment section 4 and a casing mount section 3, which may be reversibly positioned in a variety of angles relative each other.

Since illumination may not be desired at all times a bicycle is utilized, it is preferable to have a mechanism that provides a nonengaged position for the present device. Various mechanisms may be used, so long as spinner 6 of the present device is urged against tire 104 in one state, and no contact between 6 and 104 is made in another. Preferably, a spring mechanism is used that includes a lock position for the present device away from the rear tire.

Figure 2:
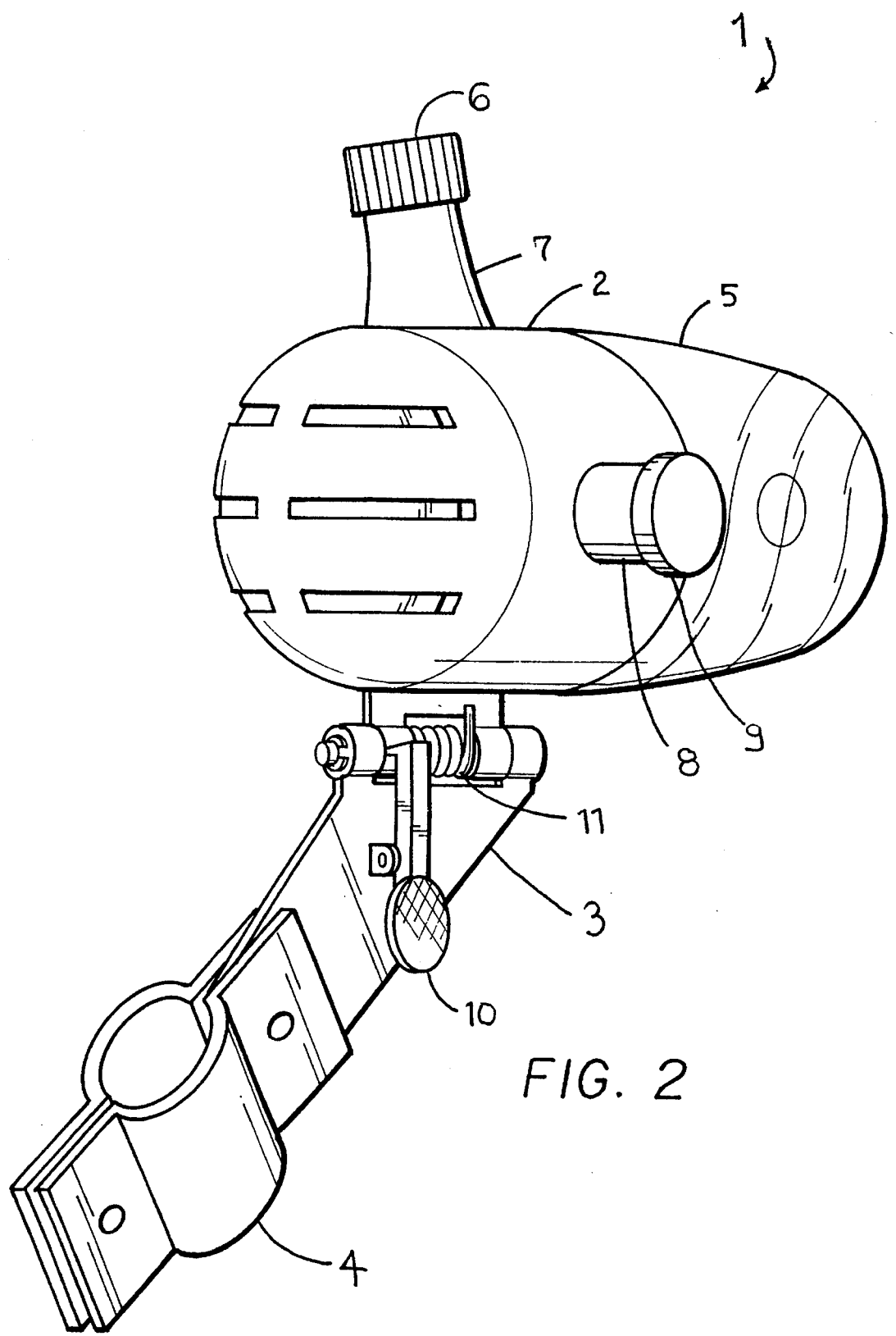
FIG. 2 is a perspective view of the same device.
Figure 3:
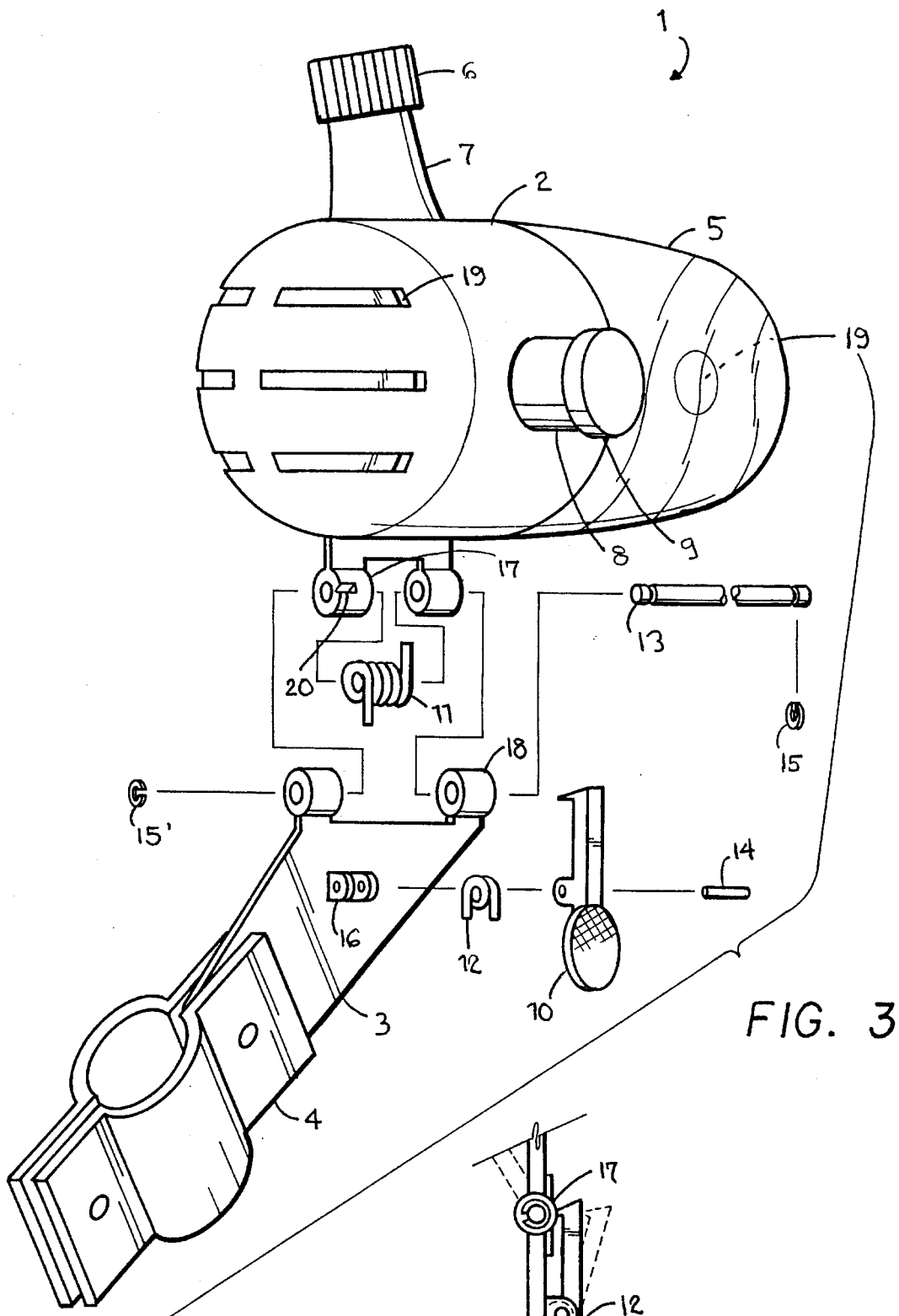
FIG. 3 is a partially exploded, perspective view thereof.
Figure 4:
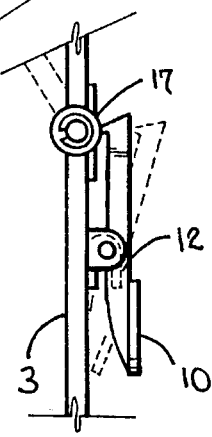
FIG. 4 is a frontal view of a spring release mechanism according to a preferred embodiment of the present invention.

As seen in FIGS. 2 and 3, the present device preferably includes a coil hinge spring 11 mounted along the axis of the hinge between casing 2 and the casing mount section 3 of the support. Casing 2 includes hinge rings 17 and casing mount section 3 has hinge rings 18 through which hinge pin 13 is placed. C-rings 15 and 15', or like mechanisms, may be used to secure pin 13 in the sleeve created by 17 and 18. Alternatively, the pin may be secured by bending one or both ends, once in place.

Hinge spring 11 urges casing 2 to rotate counter-clockwise with respect to casing mount 3, when viewed from the front of the device, as shown. A button release latch lock 10 may be used to secure the present device in a position against this rotation. As seen in FIG. 3, button release latch lock 10 is mounted in cradle 16 to pivot around pin 14 and is tensioned by lever spring 12. The button release latch lock engages a notch 20 in one of the hinge rings 17 of the casing. Alternatively, a similar device may be mounted on the casing, and engage the casing mount 3 to lock the device.

Figure 5:
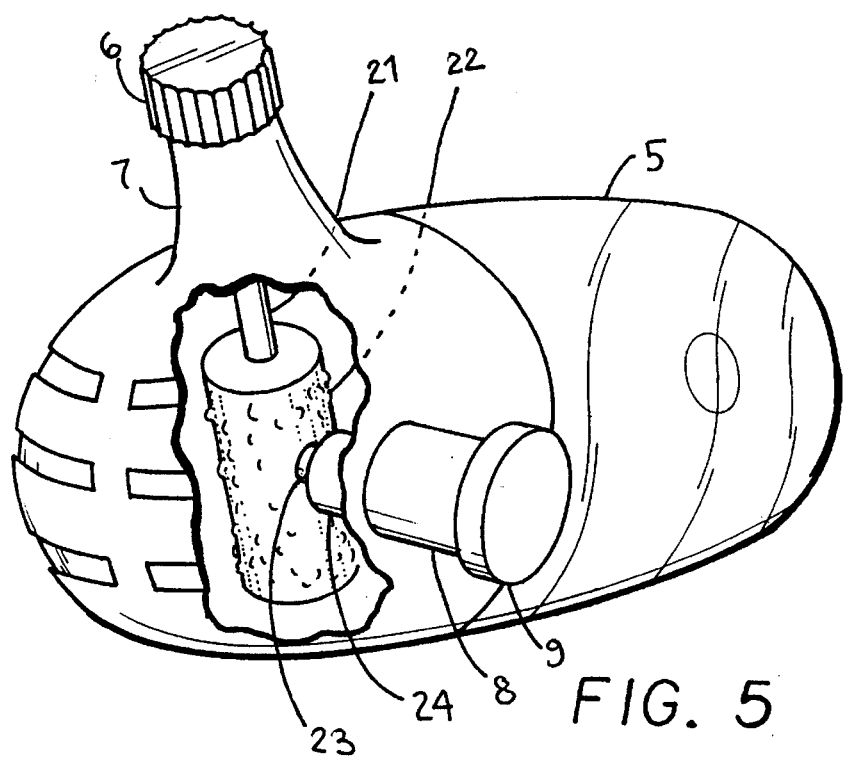
FIG. 5 is a partial cutaway, perspective side view which reveals an abrasive spinner pad according to a preferred embodiment of the present invention.

Turning to FIG. 5 of the attached drawings, the mechanism for providing illumination is detailed in cutaway. Pyrophoric material 23 is pressed against a cylindrical drum 22, which is attached through armature 21 to spinner 6. The surface of drum 22 is sufficiently abrasive to wear pyrophoric material 23, producing sparks. The pyrophoric material is held against the abrasive surface of drum 22, as will be explained below.

Figure 6:
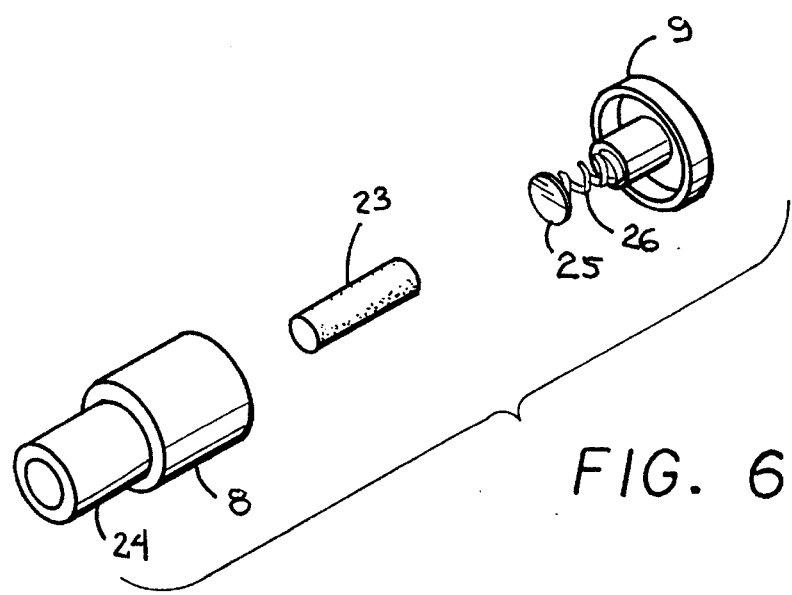
FIG. 6 is an exploded perspective view of the flint and flint holder assembly according to a preferred embodiment of the present invention.

As better shown in FIG. 6, the pyrophoric material is preferably in cylindrical form, and is secured in a cylindrical bore. The bore is sized to allow the movement of material therethrough. The bore may be provided through a cylinder which has a inner section 24 and an outer section 8. A spring 26, or the like is provided to push the material 23 against drum 22. Preferably, this spring is mounted on a removable cap 9, and includes a stop Pyrophoric material, for the purposes of the present invention, refers to any material which creates sparks upon frictional contact with an abrasive surface. The preferred pyrophoric material is flint, which is commonly available. Any like substance may be used, however. Preferably, the abrasive surface and the pyrophoric material should be chosen such that wear substantially occurs only to the pyrophoric material, not the abrasive surface. Accordingly, an abrasive surface of serrated steel or the like may be advantageously matched when flint is used as the pyrophoric material.

Though the construction of the present invention may be widely varied, it is preferable that the hollow casing has a first section of constant cross-sectional dimension. This first section is most preferably made of metal, to decrease the chance of damage from the sparking, which is initiated therein. Accordingly, spinner support 7 is mounted on this first section, as is flint holder 8, to position the contact of pyrophoric material 23 with abrasive surface 22 within this first section.

A second section which may be unitary with the first or of disparate materials and/or construct encloses the front end of the first section. This second section is most preferably bowl shaped, and protrudes from the first section. Air vents 19 may be optionally provided to facilitate sparking. Vents on the periphery, as shown, are most preferred, since overabundant wind may quench the desired sparking effect.

Attached to the rear of casing 2 is a display vessel 5. This hollow vessel is preferably of a clear or colored translucent material which allows the sparking effect generated in casing 2 to be seen as a luminescent tail. Most preferably, the display vessel is sized to fit flush with the casing, and may be attached in any appropriate manner. For example, a threaded attachment would allow interchangeable vessels of different shapes, colors, and/or materials to be used with a single casing.

In operation, the present device is easily engaged by pressing the button release latch lock 10. The operator then proceeds to ride the bicycle, causing sparks to be displayed in illuminating patterns in display vessel 5. The intensity of the sparking effect will vary directly with the speed of cycling, thereby rewarding greater effort with more impressive displays of lightning-like showers.

It is to be understood that the present invention is not limited to the sole embodiment described above, but encompasses any and all embodiments within the scope of the following claims.

I claim:

1. An illumination device for bicycles comprising:

a spinner;

a cylindrical drum having an abrasive surface; said drum attached to said spinner through an armature to rotate therewith, said spinner, armature, and cylindrical drum having a common axis of rotation;

pyrophoric material;

holding means for holding said pyrophoric material against said abrasive surface normal said axis of rotation of said spinner, armature, and cylindrical drum;

a hollow casing, for supporting said spinner and said holding means, such that said cylindrical drum is contained within said casing, said hollow casing having..a spinner support integral therewith;

a nonopaque, hollow display vessel, attached to said hollow casing;

support means for attaching said casing to a rear strut of a bicycle; and hinging means intermediate said support means and said casing for urging said support means against a rear tire attached to said rear strut of said bicycle.

2. The illumination device according to claim 1, wherein said hinging means further comprises locking means for holding said casing at a position away from said rear tire.

3. The illumination device according to claim 2, wherein said locking means includes a spring release latch.

4. The illumination device according to claim 1, wherein said pyrophoric material is flint.

5. The illumination device according to claim 1, wherein said abrasive surface is serrated steel.

6. The illumination device according to claim 1, wherein said holding means includes a cylindrical bore, and a spring loaded piston.

7. The illumination device according to claim 6, wherein said holding means further includes a removable cap on which said spring loaded piston is mounted.

8. The illumination device according to claim 1, wherein said hollow casing has a first section of constant cross-sectional dimension, and a second section which encloses one end of said first section.

9. The illumination device of claim 8, wherein said second section is bowl shaped.

10. The illumination device of claim 8, wherein said second section is perforated with at least one aeration vent.

11. The illumination device of claim 8, wherein said non-opaque display vessel extends from said first section, opposite said second section.

12. The illumination device according to claim 11, wherein said display vessel is sized to be flush with said first section on one end, and on the other end diminishes in cross-sectional dimension to an opening.

13. The device according to claim 1, wherein said support means includes a pivot, strut engaging means attached to said pivot, and bracing means for attaching said hinging means also attached to said pivot.

14. The device according to claim 13, wherein said strut engaging means and said bracing means may be reversibly secured in a variety of angled positions relative to each other.

* * * * *